Feb. 9, 1932.     G. WANDSCHEER     1,844,706
SNOWPLOW
Filed Aug. 24, 1929     5 Sheets-Sheet 2
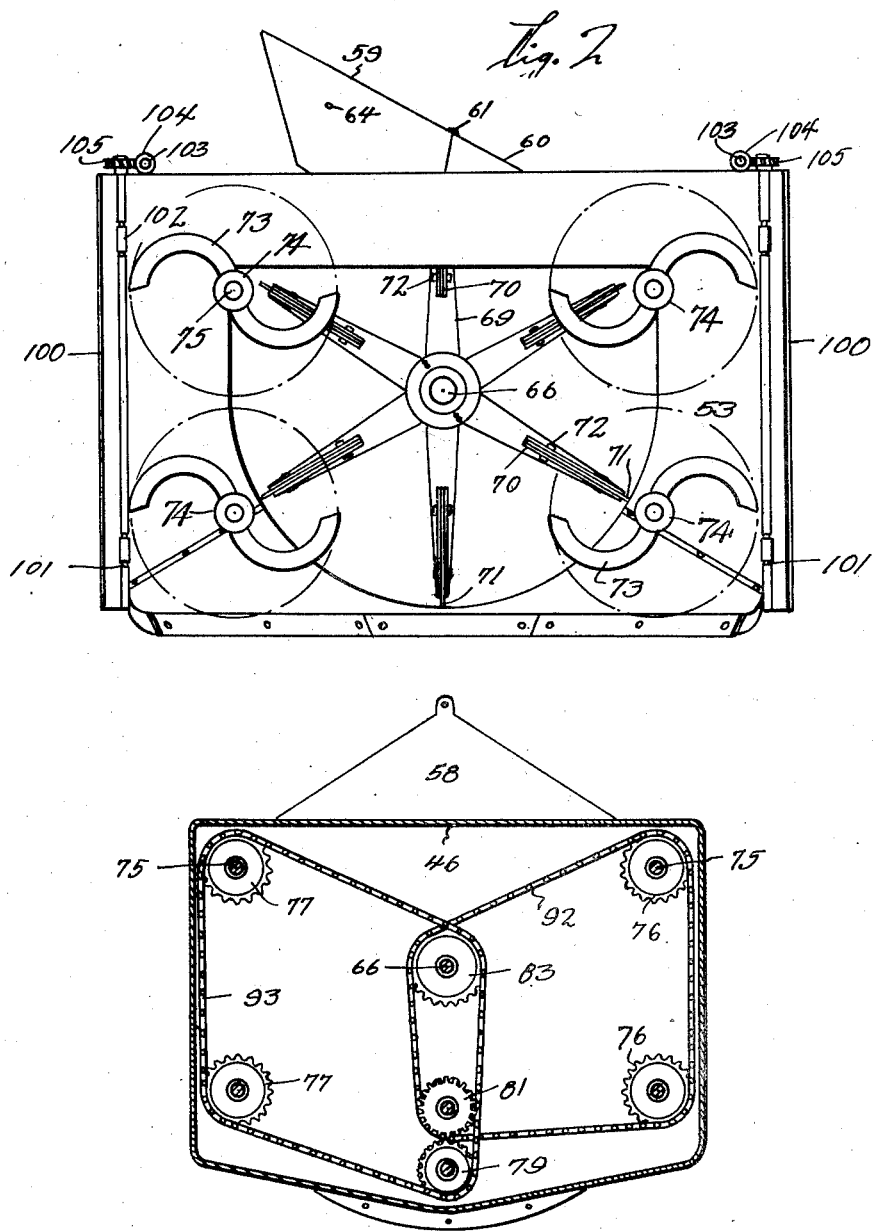

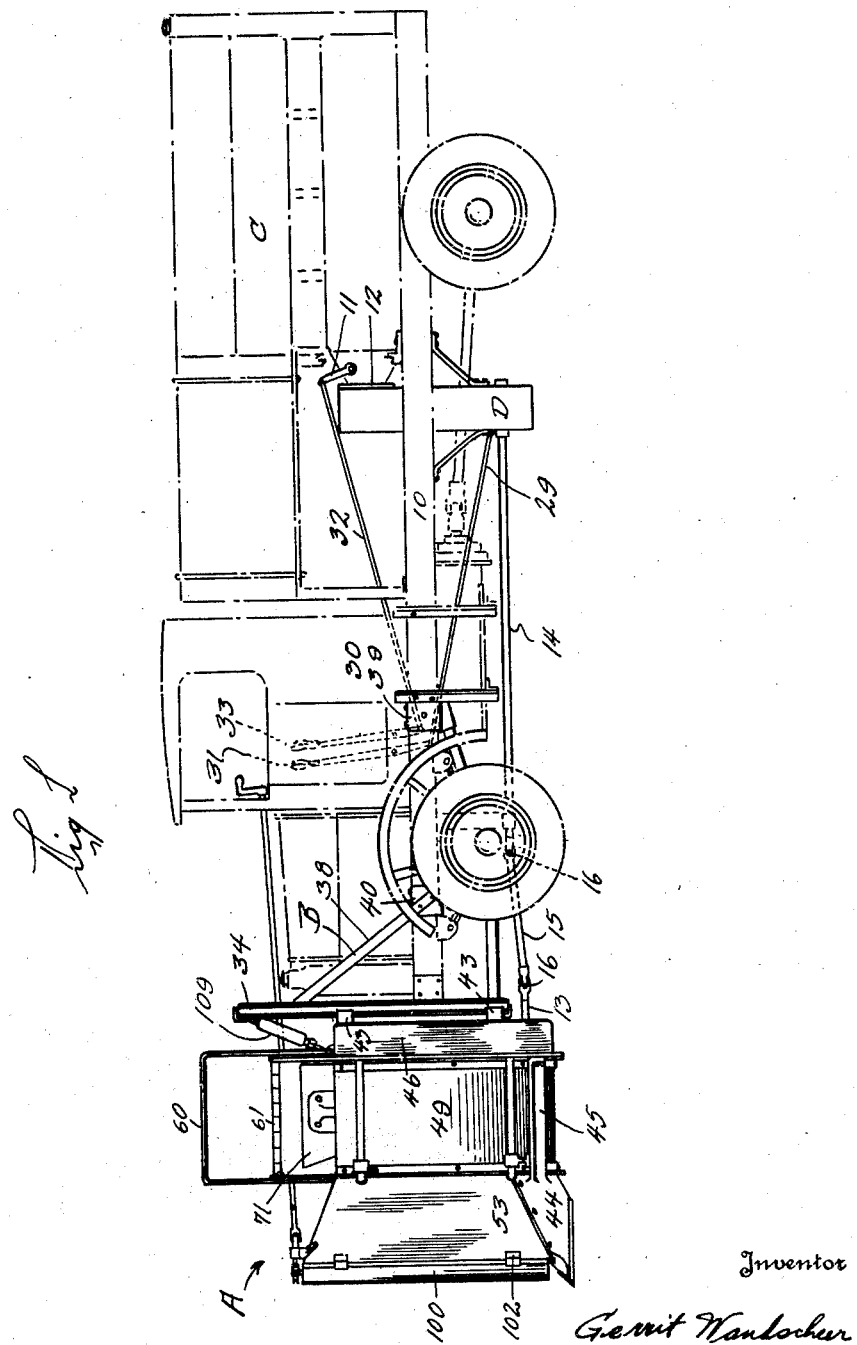

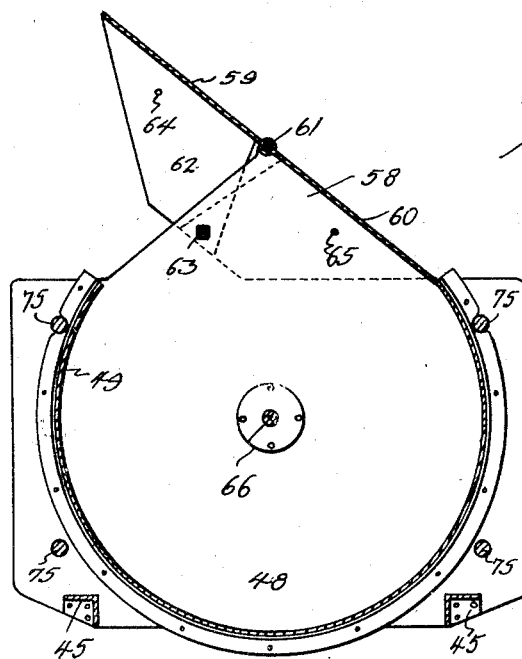
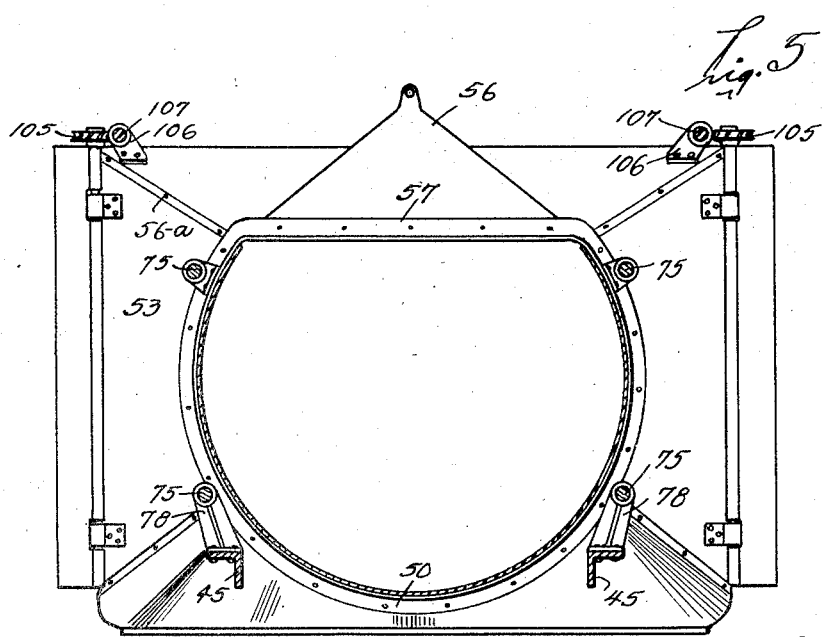

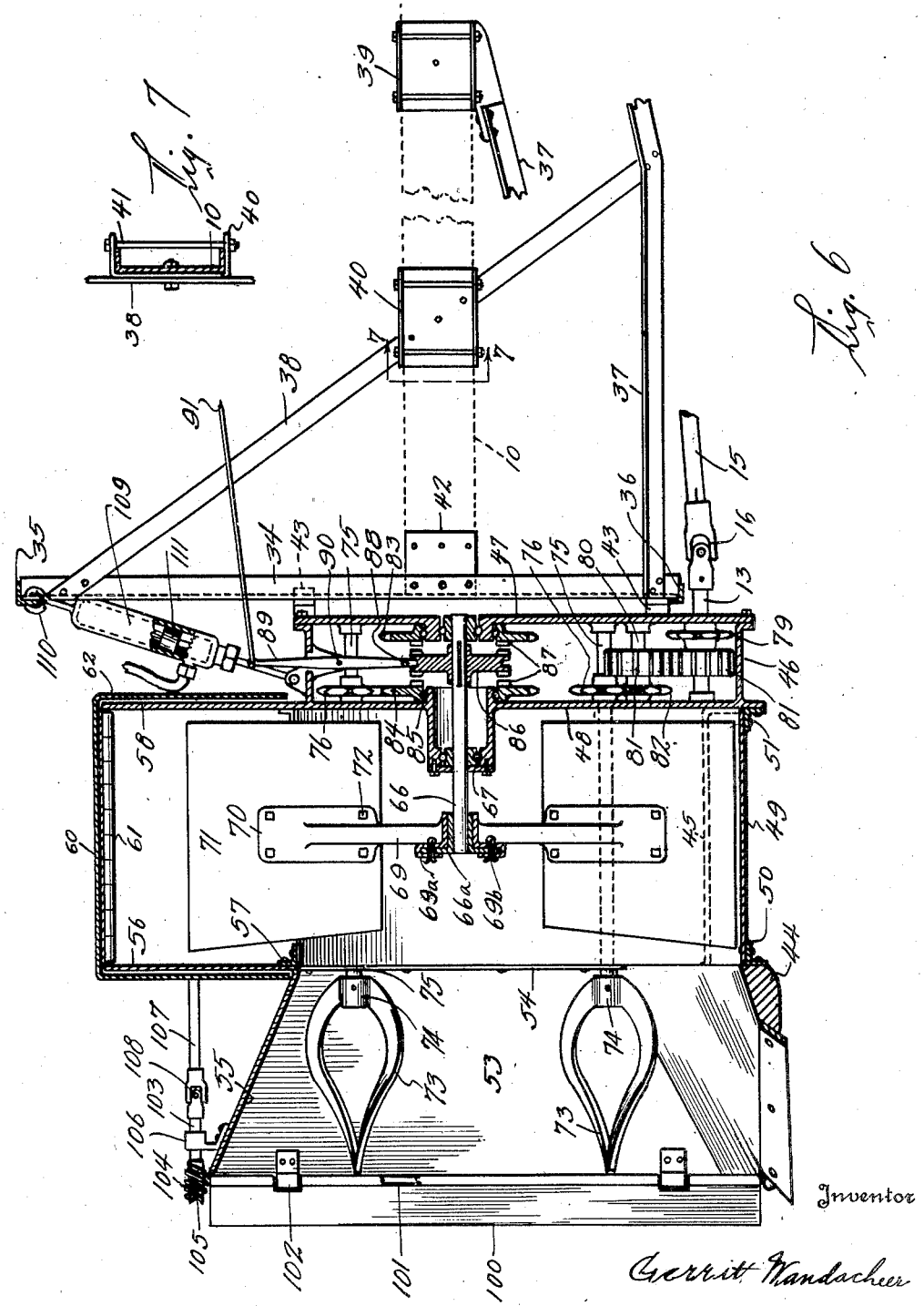

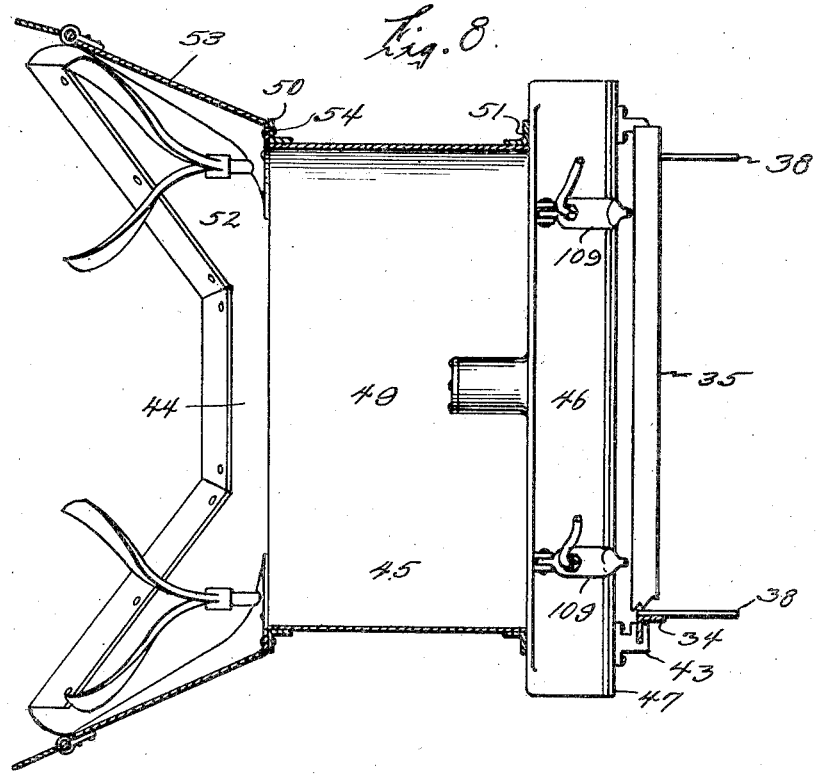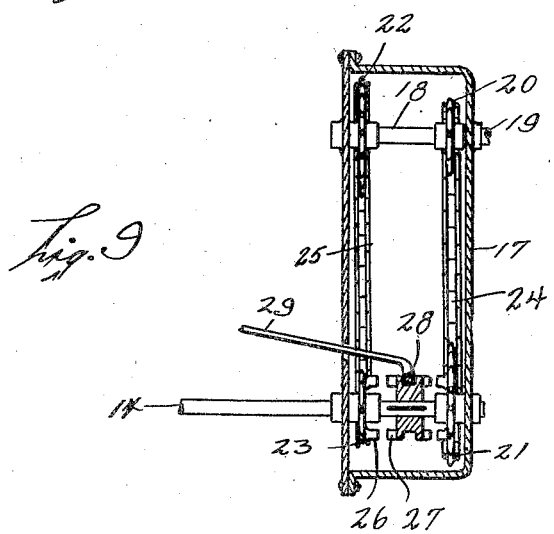

Patented Feb. 9, 1932

1,844,706

UNITED STATES PATENT OFFICE

GERRIT WANDSCHEER, OF SIOUX CENTER, IOWA

SNOWPLOW

Application filed August 24, 1929. Serial No. 388,081.

My invention relates to snow plows and has for its object to provide a snow plow attachment for a motor truck.

More particularly, my invention relates to that type of plow employing a rotating ejector for throwing snow in combination with means for feeding snow to the ejector.

It is my purpose to provide a simple, durable and comparatively inexpensive attachment structure of this type including an attachment frame, adapted to be secured to the side rails of a motor truck chassis and a snow plow unit mounted on said frame for vertical adjustment relative thereto.

A further object is to provide a simple device for providing elevating power for the plow unit. My invention in this respect is embodied in a hydraulic lift, which is very simple in construction and effective in operation.

A further object is to provide a simple and practical arrangement for providing power in two speeds for the snow plow mechanism, the power plant and control mechanism for this purpose being entirely independent of the power plant for propelling the truck.

Another object is to provide an arrangement in which the power plant and snow plow mechanism including the attachment frame may be readily and easily removed from the truck.

The invention in this respect contemplates the mounting of the plow attachment frame on the forward end of the truck and the mounting of the power plant on the rear of the truck. It is my object to connect up the power plant with the power mechanism by a drive which extends completely under the frame and transmission of the truck. Such a drive makes it possible to attach the plow mechanism and power plant and connect the two without altering the structure of the truck in any way.

My invention further contemplates a novel gathering scoop and scoop frame construction providing increased strength over prior structures and adding to the ease and accuracy of construction.

My invention in this respect contemplates a heavy cast scoop bed having integral arms projecting rearwardly to connect the scoop frame with the transmission frame of the device.

Another object is to provide an arrangement in which the scoop may be funnel-shaped. In this regard, it may be stated that so far a funnel-shaped scoop has not been considered practical for the reason that the snow will wedge and pack in the scoop. My invention contemplates a scoop of funnel shape, together with novel snow cutters, adapted to prevent the snow from wedging in the scoop. In general, this is accomplished by shaping and positioning the cutters so that their regions of movement will comprise the major portion of the space within the scoop in front of the inclined walls thereof.

Another object is to provide a scoop construction in which the major portion of the cutting by the scraping blade of the scoop will be done on an angle. More specifically, my invention contemplates a semi-V shaped scoop bed having scraping blades attached in semi-V shaped formation.

Another object is to provide an arrangement in which the plow unit includes a transmission for carrying the power of the under frame drive shaft to the ejecter rotor and the snow cutter. It is my purpose to provide a very simple transmission arrangement for carrying power to the ejector rotor so that the latter may be rotated in either direction and for carrying power to four cutters.

A further object is to provide a simple transmission of the kind just mentioned in which the rotor may be reversed without affecting the operation of the cutters.

A further object is to provide a snow cutter construction adapted to not only clear the snow from the inclined sides of the scoop but also to urge the snow rearwardly into the ejector casing.

One of the most important objects of my invention is to provide an arrangement in which the snow cutter will not in any way interfere with the travel into the ejector casing of that portion of the snow which would normally travel into the casing due to the pushing action of the snow ahead of it.

Our invention contemplates a plow which is adapted to be built as an attachment for standard automobile trucks. It will be understood, however, that the invention may be embodied in a unitary structure including both carriage and plow.

Another object of my invention is to provide a novel form of ejector rotor construction.

With these and other objects in view, my invention consists in the construction and arrangement and combination of the various parts of my device, whereby the objects contemplated are attained, as hereinafter more fully set forth, pointed out in my claims, and illustrated in the accompanying drawings, in which:

Fig. 1 is a side elevation of a complete snow plow including my attachment attached to an ordinary motor truck.

Fig. 2 is a front elevation of the plow.

Fig. 3 is a sectional view taken through the transmission housing and looking forwardly.

Fig. 4 is a sectional view through the ejector casing looking rearwardly.

Fig. 5 is a sectional view through the ejector casing looking forwardly.

Fig. 6 is a vertical, central, sectional view through the entire plow attachment, parts being broken away to condense the size of the figure.

Fig. 7 is a detail, sectional view taken on the line 7—7 of Fig. 6.

Fig. 8 is a view partly in plan and partly in horizontal section of the plow.

Fig. 9 is a detail, sectional view through the change speed transmission.

A funnel-shaped scoop has the advantage of offering only the resistance of the cutting edges of the scoop, which resistance is much smaller than that of the sides of the scoop which has to wedge its way through a drift. However, in a funnel-shaped scoop, the resistance would be transferred to the inside of the scoop in the wedging and packing of the snow within the scoop unless some means were provided for preventing such wedging or packing.

A further advantage of the funnel-shaped scoop lies in the possibility of making the entering area of the scoop much larger than the transverse, cross-sectional area of the ejector casing and slanting the sides of the scoop to the ejector casing opening.

The solution of the problem of preventing wedging and packing within the scoop and at the same time offering practically no resistance to the passage into the scoop of that portion of the body of snow which is directly in line with the ejector casing opening lies in the provision of cutting blades adapted to traverse a major portion of the space in front of the inclined walls of the scoop, leaving the space directly in front of the ejector casing opening practically unobstructed.

The action of the device embodying this principle in passing through a heavy drift is as follows: The cutting blades constantly churn the space in front of the inclined walls of the scoop and at the same time are constructed to urge the snow rearwardly. The unobstructed central core of snow moves directly into the ejector casing, while the side regions of the snow are chopped up and fed into the casing from the corners thereof. Any portion of the snow bank that may project above the casing opening will drop by gravity into position to enter the opening.

Referring now to the drawings, the attachment is shown in full lines in Fig. 1 and the truck to which it is attached is shown in broken lines. The attachment includes in general a plow unit which is indicated generally by the reference character A in Fig. 1, an attachment frame on which said plow unit is mounted, which is indicated generally by the reference character B and a power plant which is indicated generally by the reference character C.

The power plant C is mounted directly on the side rails 10 of the truck chassis, the body of the truck being removed for the accommodation of the power plant. The power plant C is preferably a heavy, internal combustion engine of a type adapted to be employed for such uses as the present and its construction is not described herein in detail. The clutch lever of the engine is shown at 11 and the transmission end of the housing is indicated at 12.

The plow unit A is driven entirely by a shaft 13, which is connected to the power plant by the propellor shaft 14, which includes a swinging section 15, connected to it and to the shaft 13 by universal joints 16.

The propellor shaft 14 is geared to the power plant through the medium of a change speed transmission, indicated generally by the reference character D in Fig. 1 and shown in detail in Fig. 9. The transmission includes a casing 17, which is adapted to be bolted to the end 12 of the engine housing. A shaft 18 is journalled in the upper region of the housing 17 and includes an appropriately formed end 19 to form a driving connection with the end of the engine crank shaft or the fly wheel thereof.

The propellor shaft 14 extends through the lower region of the transmission housing 17 and is journalled therein.

On the shaft 18 at one side of the housing 17 is a small drive sprocket 20 and on the shaft 14, aligned with the sprocket 20 is a large driven sprocket 21. On the other side of the housing 17, the shaft 18 is provided with a large drive sprocket 22 and aligned therewith as a small driven sprocket 23.

Chains 24 and 25 connect the pairs of sprockets 20—21 and 22—23, respectively.

The sprockets 22 and 20 are secured to the shaft 18 and the sprockets 23 and 21 are loosely mounted on the shaft 14. The sprockets 23 and 21 include clutch elements 26, which are adapted to be engaged with a sliding clutch member 27, having a double clutch face. The sliding clutch member 27 is controlled by a shifting fork 28, which has a rod 29, extending to the cab 30 of the truck and connected to a shifting lever 31.

The clutch lever 11 is connected by a rod 32 to a clutch control lever 33 in the cab.

The attaching frame B comprises a pair of angle irons 34, secured together by cross braces 35 and 36, a pair of longitudinal arms 37, secured at their forward ends to the angle irons 34 and a pair of diagonal braces 38, secured between the upper regions of the angle irons 34 and the intermediate regions of the arms 37.

To the ends of the arms 37 and to the intermediate portions of the braces 38 are secured brackets 39 and 40, respectively, adapted to embrace the rails 10 of the truck chassis and to be secured thereto by bolts 41.

The brackets 39 are channel-shaped in cross section, as shown in Fig. 7.

A bracket 42 is provided to attach the intermediate portion of each channel iron 34 to the forward end of one of the rails 10.

The angle irons 34 are disposed in vertical positions with flanges extending away from each other when the attachment frame is secured to the truck chassis. These opposed flanges of the angle irons form slides to be received in forks 43, secured rigidly to the plow unit A.

The plow unit has a plow bed, indicated at 44 in Fig. 6. This plow bed is what may be termed, "semi-V shaped" as shown in plan in Fig. 8. The plow bed is formed of cast steel or the like and is formed with a pair of spaced, parallel, rearwardly projecting arms 45, by means of which the plow bed is attached to the plow unit transmission housing 46. The transmission housing 46 forms the supporting medium for the plow unit, the forks 43 being secured to the rear wall 47 of the transmission housing.

The arms 45 are shown in cross section in Figs. 4 and 5 and are indicated in dotted lines in Figs. 6 and 8. The rear ends of the arms 45 are bolted directly to the forward wall 48 of the transmission housing 46.

The ejector casing 49 fills the space between the scoop and the transmission housing 46 and comprises merely a curved wall of sheet metal, supported between a pair of curved angle iron ribs 50 and 51.

The rib 50 is secured to and supported from the rear face of the plow bed 44. The rib 51 is secured to and supported by the forward wall 48 of the transmission housing.

The plow bed 44 in vertical, transverse section is curved upwardly to conform to the curvature of the ejector casing 49. The outer extremities or wings (which may be referred to conveniently by the reference character 52) of the plow bed are thus inclined upwardly to a considerable height at their rear extremities, while the central portion is inclined upwardly slightly.

The side walls 53 of the scoop are secured to the rear edges of the wings 52 and extend vertically upwardly therefrom. The wings 53 are curved inwardly somewhat at their rear corners to conform to the curvature of the ejector casing 49 and are provided with flanges 54, secured to the casing 49, as shown in Fig. 8 and Fig. 5.

It will be noted that the side walls 53 are diverged outwardly and forwardly, the rear edges of the wings 52 being properly inclined for this purpose.

The upper wall 55 of the scoop is secured as at 56a to the upper extremities of the side walls 53, (see Fig. 5) and its rear extremity is bent upwardly as at 56 and secured to a horizontal portion 57 of the rib 50.

The wall 48 of the transmission housing 46 is continued upwardly as at 58 and the walls 56 and 58 are triangular in shape, as shown in Figs. 4 and 5.

The discharge nozzle of the ejector is formed between the walls 56 and 58 and a pair of hoods 59 and 60, respectively, hinged together at 61 and hinged between the walls 56 and 58 at their apexes.

The hoods 59 and 60 and side walls 62, overlap the walls 56 and 58 and each other and are provided with properly positioned openings to receive bolts 63, by means of which they may be secured to the walls 56 and 58.

The openings 64 and 65 in the hood walls and casing walls, respectively, are so positioned that the hoods 59 and 60 each may be secured in either of two positions, one projecting upwardly to disclose an opening between the hinge 61, and one edge of the ejector casing 49 and the other in which the hood closes said opening.

By providing intermediate openings, the hoods may be secured in intermediate positions, varying the angle at which snow will be ejected from the casing.

It is thought to be obvious how the hoods may be adjusted to form a nozzle to discharge snow in either direction from the ejector.

The hub of the spider 69 is provided with a pair of hooked arms 69a, which are secured to the arms of the shaft hub 66a by means of shear pins 69b. Should any large obstruction become lodged in the ejector casing, the shear pins 69b will be sheared before injury can occur to the rotor blades 71.

The blades 71 are clamped between fingers 70 by means of bolts 72 threaded through the fingers 70. The fingers 70 are formed integrally with the arms 69, (see Figs. 6 and 2).

The cutting knives are provided in the form of a pair of blades 73, provided with a central hub 74 and spiraling forwardly and outwardly from said hub around the axis thereof. The blades, when rotated, describe a path which is in the shape of a truncated cone and are shaped so that when rotated they will exert a screw effect against the snow that they engage, tending to draw said snow rearwardly toward their hubs.

The cutters are positioned in the four corners of the scoop, as shown in Fig. 2 and their paths of travel are such as to substantially include all of the volume of space within said corners. In addition, their paths of travel include a portion of the space ahead of the ejector casing opening, thus clearing a way for the snow which is moved inwardly from the corners of the scoop.

The paths of travel are indicated in dotted lines in Fig. 2 and it will be noted that the two cutters on a particular side of the scoop have paths that substantially come together, thus including most of the space ahead of the side walls. The lower cutters include most of the space ahead of the wings 52 of the plow bed, the portion of the plow bed which is not covered by the cutters being low and offering little resistance to the passage of snow over it.

The region between the two upper cutters is open for the reason that there will be practically no tendency of the snow to stick against the upper wall. This portion of the snow will fall downwardly to the proper level to enter the ejector casing.

The cutters are mounted on shafts 75, which project rearwardly on either side of the ejector casing and into the transmission housing 46, where they are provided with sprockets 76 and 77, respectively. The shafts 75 are journalled in bearings 78, supported on the arms 45 on the ejector casing (Fig. 5), and in the transmission housing. They extend through the side walls of the scoop as shown in Fig. 8.

The sprockets 76 carry power to the cutters on one side of the scoop and are positioned forwardly in the transmission housing. The sprockets 77 drive the cutters on the other side of the scoop and are positioned rearwardly in the transmission housing.

The shaft 13 is provided within the housing 46 with a drive sprocket 79 and a countershaft 80, geared to the shaft 13 by gears 81, is provided with a drive sprocket 82.

It will now be seen that the drive sprockets 79 and 82 will travel in opposite directions. This construction makes it possible to rotate the cutters on one side of the scoop in a direction opposed to the direction of the cutters in the other side of the scoop and also to provide rotation for the rotor in either direction.

To this end, the rotor is provided with a pair of driven sprockets 83 and 84, respectively, which are journalled on bearings 85, carried by the housing 46, coaxial with the rotor shaft 66 and aligned respectively with the drive gears 79 and 82. The sprockets 83 and 84 are normally unconnected with the shaft 66 but may be connected therewith by a double faced clutch member 86, slidably splined upon the shaft 66, adapted to engage the clutch elements 87 of either of the sprockets 83 or 84 and shifted by a clutch fork 88 on a clutch lever 89, fulcrumed at 90 in the housing 46.

A clutch control rod 91 extends to the cable of the truck.

The clutch element 86 may be positioned either neutrally or in engagement with either one of the sprockets. When positioned neutrally, the rotor will be disconnected from its driving mechanism.

A chain 92 (Fig. 3) extends around the drive sprocket 82 and the sprockets 76 and 84. A chain 93 extends around the drive sprocket 79 and the sprockets 77 and 83.

It will now be seen that with a very simple arrangement of sprockets and gears, the cutters are rotated in opposite directions and the rotor is adapted to be rotated in either direction.

I provide an adjustable wing 100, carried upon a shaft 101, journalled in bearings 102 on the side walls 53 of the scoop and angularly adjusted by means of an adjusting shaft 103, provided with a worm 104, engaging a worm wheel 105 on the wing shaft 101. The shaft 103 is journalled in the bracket 106, secured to the scoop and is rotated by a control shaft 107, extending to the cab of the truck and connected to the shaft 103 by a universal joint 108.

The plow unit is supported by a hydraulic lift comprising a pair of cylinders 109, suspended as at 110 from the top of the attachment frame B and provided with pistons 111.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In a snow plow of the rotary type, in combination with a transmission casing, means for supporting said transmission casing on a vehicle, a plow base, a pair of arms formed integrally with said base, spaced laterally on either side of the center thereof, extending rearwardly and secured to the transmission casing and an ejector casing secured between the transmission casing and the plow base, the arms serving to form a supporting connection between the base and the transmission casing.

2. In a snow plow, of the rotary type, in combination with an ejector including a rotor, a rotor shaft and an ejector casing, a scoop communicating with the forward side of the ejector casing, a transmission casing secured to the rear side of the ejector casing, an ejector shaft extending into the transmission casing centrally thereof, a plurality of cutter shafts extending from the transmission casing in directions parallel to the rotor shaft and into the scoop, cutters on said cutter shafts, one of said cutter shafts being disposed on either side of the axis of the ejector, a pair of drive sprockets loosely mounted on the rotor shaft within the transmission casing, a sprocket on one of the cutter shafts alined with one of the sprockets on the rotor shaft, a sprocket on the cutter shaft of the other side alined with the other sprocket on the rotor shaft, a clutch device slidably mounted between the sprockets on the rotor shaft adapted to be shifted to engage either of the sprockets to connect the sprocket which it engages to the rotor shaft, chains connecting the respective alined sprockets and means for driving said chains in opposite directions.

3. In a snow plow, of the rotary type, in combination with an ejector including a rotor, a rotor shaft and an ejector casing, a scoop communicating with the forward side of the ejector casing, a transmission casing secured to the rear side of the ejector casing, an ejector shaft extending into the transmission casing centrally thereof, a plurality of cutter shafts extending from the transmission casing in directions parallel to the rotor shaft and into the scoop, cutters on said cutter shafts, one of said cutter shafts being disposed on either side of the axis of the ejector, a pair of drive sprockets loosely mounted on the rotor shaft within the transmission casing, a sprocket on one of the cutter shafts alined with one of the sprockets on the rotor shaft, a sprocket on the cutter shaft of the other side alined with the other sprocket on the rotor shaft, a clutch device slidably mounted between the sprockets on the rotor shaft adapted to be shifted to engage either of the sprockets to connect the sprocket which it engages to the rotor shaft, chains connecting the respective alined sprockets and means for driving said chains in opposite directions, said means comprising a pair of drive sprockets, a pair of drive sprocket shafts upon which said drive sprockets are mounted and a pair of spur gears connecting said drive sprocket shafts.

4. In a snow plow of the rotary type, in combination with a motor truck having a power plant mounted upon its rear, said power plant including a transmission, a plow mounted forwardly of the truck, a drive shaft embodied in said plow, a transmission shaft connected with said plow drive shaft and extending beneath the frame of the vehicle and change speed transmission for connecting said transmission shaft to the shaft of the said power plant comprising a vertically disposed housing, supported in the frame of the truck, the rear end of the transmission shaft being extended through the lower portion of the housing and journalled therein, the upper portion of the housing being secured to the forward region of the power plant transmission, an upper shaft mounted in the housing and connected with the power plant shaft, a pair of sprockets mounted on said upper shaft, a pair of sprockets loosely mounted on the transmission shaft and alined with the sprockets on the upper shaft, chains connecting said sprockets, and a clutch element slidably secured to the transmission shaft between the sprockets thereon and adapted to engage either sprocket to connect the same to the transmission shaft.

5. In a snow plow, a scoop having rearwardly and inwardly inclined side walls, an ejector attached to the rear of the scoop and communicating therewith and helical cutters mounted for rotation on axes parallel to the path of movement of the plow, said cutters being arranged in pairs, the cutters of a particular pair being positioned one above the other so that their paths of movement will cover a substantial portion of the area of a side wall of the scoop.

6. In a snow plow, a scoop having rearwardly and inwardly inclined side walls, an ejector attached to the rear of the scoop and communicating therewith, and helical cutters mounted for rotation on axes parallel to the path of movement of the plow, said cutters being arranged in pairs, the cutters of a particular pair being positioned one above the other adjacent a side wall and each cutter having a path of movement generating a substantially cone shaped space.

7. In a snow plow, a scoop having rearwardly and inwardly inclined side walls, an ejector attached to the rear of the scoop and communicating therewith, and helical cutters mounted for rotation on axes parallel to the path of movement of the plow, said cutters being arranged in pairs, the cutters of a particular pair being positioned one above the other adjacent a side wall and each cutter having a path of movement generating a substantially cone shaped space, and a maximum diameter substantially one-half the height of a side wall of the scoop.

8. In a snow plow, a scoop having side walls, an ejector attached to the rear of the scoop and communicating therewith, and cutters mounted for rotation on axes parallel to the path of movement of the plow, said cutters being arranged in pairs, the cutters of a particular pair being positioned one above the other adjacent a side wall and each cutter having a path of movement generating a space having a maximum diameter substantially one-half the height of a side wall of the scoop.

9. In a snow plow, a scoop having rearwardly and inwardly inclined side walls, an ejector attached to the rear of the scoop and communicating therewith, and cutters mounted for rotation on axes parallel to the path of movement of the plow, each cutter comprising a rotated hub, and an arm projected forwardly and radially outwardly therefrom, said arm when rotated generating a cone shaped space closely adjacent a side wall of the scoop.

10. In a snow plow of the rotary type, in combination with an ejector including a rotor, a rotor shaft and an ejector casing, a scoop communicating with the forward side of the ejector casing, a transmission casing secured to the rear side of the ejector casing, an ejector shaft extending into the transmission casing centrally thereof, a plurality of cutter shafts extending from the transmission casing in directions parallel to the rotor shaft and into the scoop, cutters on said cutter shafts, one of said cutter shafts being disposed on either side of the axis of the ejector, a pair of drive sprockets loosely mounted on the rotor shaft within the transmission casing, a sprocket on one of the cutter shafts aligned with one of the sprockets on the rotor shaft, a sprocket on the cutter shaft of the other side aligned with the other sprocket on the rotor shaft, chains connecting the respective aligned sprockets and means for driving said chains in opposite directions, and clutch means for selectively connecting either of the drive sprockets to the rotor shaft.

11. In a snow plow, a vehicle, a frame attached to said vehicle, including parallel upright guides, an upper transverse member, a pair of longitudinal arms secured to the lower ends of the guides, and a pair of braces secured to the upper ends of the guides, and to the arms at positions spaced from the guides, means carried by said braces and by the rear ends of the arms for attachment to the chassis members of a vehicle, a plow, means on the plow slidably engaging the guides and supporting the plow thereby against tilting movement, and a pair of hydraulic lift members operably connected between the plow and said transverse member.

12. In a snow plow, a vehicle, a frame attached to said vehicle, including parallel upright guides, an upper transverse member, a pair of longitudinal arms secured to the lower ends of the guides, and a pair of braces secured to the upper ends of the guides, and to the arms at positions spaced from the guides, means carried by said braces and by the rear ends of the arms for attachment to the chassis members of a vehicle, a plow, means on the plow slidably engaging the guides and supporting the plow thereby against tilting movement, and a pair of lift members operably connected between the plow and said transverse member.

Signed this 17th day of August, 1929, in the county of Woodbury and State of Iowa.

GERRIT WANDSCHEER.